US012083611B2

(12) United States Patent
Rakurty et al.

(10) Patent No.: US 12,083,611 B2
(45) Date of Patent: Sep. 10, 2024

(54) METHOD OF CUTTING WITH A BAND SAW

(71) Applicant: The M.K. Morse Company, Canton, OH (US)

(72) Inventors: Chandra Sekhar Rakurty, Massillon, OH (US); Roan Murphy Kirwin, Canton, OH (US)

(73) Assignee: The M.K. Morse Company, Canton, OH (US)

( * ) Notice: Subject to any disclaimer, the term of this patent is extended or adjusted under 35 U.S.C. 154(b) by 281 days.

(21) Appl. No.: 17/842,944

(22) Filed: Jun. 17, 2022

(65) Prior Publication Data
US 2022/0324041 A1 Oct. 13, 2022

Related U.S. Application Data

(63) Continuation-in-part of application No. PCT/US2021/026356, filed on Apr. 8, 2021, which is
(Continued)

(51) Int. Cl.
*B23D 55/06* (2006.01)
*B23D 59/00* (2006.01)

(52) U.S. Cl.
CPC ............ *B23D 55/06* (2013.01); *B23D 59/001* (2013.01)

(58) Field of Classification Search
CPC ...... B23D 55/06; B23D 55/08; B23D 55/086; B23D 55/04; B23D 59/001; B23D 53/04;
(Continued)

(56) References Cited

U.S. PATENT DOCUMENTS 3,682,030 A * 8/1972 Harris ................. B23D 53/045
83/820
4,127,045 A * 11/1978 Blucher .............. B23D 55/088
83/820
(Continued)

FOREIGN PATENT DOCUMENTS

WO 2005044495 A1 5/2005

OTHER PUBLICATIONS

First Examination Report filed in the corresponding Indian application; dated Nov. 15, 2022; 5 pages.
International Search Report filed in the corresponding PCT Application; 5 pages.
Written Opinion filed in the corresponding PCT Application; 7 pages.
(Continued)

*Primary Examiner* — Ghassem Alie
(74) *Attorney, Agent, or Firm* — Black McCuskey

(57) ABSTRACT

A method of cutting a workpiece with a band saw is disclosed herein. The method includes rotating, with a band saw machine, a blade about a central longitudinal axis. The method also includes moving, with the band saw machine, the blade and a workpiece relative to the other to form a cut in the workpiece. The method also includes supporting a back edge of the blade at a first position before a lateral entry position of the cut or a second position after a lateral exit position of the cut with a first back support member. The method also includes extending an extension arm of the first back support member to shift the back edge a first distance rectilinearly along the central longitudinal axis toward the workpiece, wherein the shifting is cumulative to rectilinear movement from the moving.

13 Claims, 7 Drawing Sheets

Related U.S. Application Data a continuation-in-part of application No. 17/079,301, filed on Oct. 23, 2020, now Pat. No. 11,396,054.

(60) Provisional application No. 63/105,989, filed on Oct. 27, 2020, provisional application No. 63/007,157, filed on Apr. 8, 2020.

(58) Field of Classification Search
CPC ...... B23D 53/02; B23D 55/065; B23D 55/10; B25D 55/082; B26D 1/46; B26D 5/30; G05B 19/402; G05B 2219/45044; G05B 2219/50047
USPC .. 83/13, 74, 56, 72, 789, 796, 801, 820, 76, 83/788, 798, 800, 811, 812
See application file for complete search history.

(56) References Cited

U.S. PATENT DOCUMENTS

| | | | |
|---|---|---|---|
| 4,766,790 A * | 8/1988 | Harris | B23D 55/088 |
| | | | 83/72 |
| 2009/0126549 A1 | 5/2009 | Dietz | |
| 2013/0276602 A1* | 10/2013 | Washio | B23D 59/002 |
| | | | 83/13 |
| 2014/0360322 A1* | 12/2014 | Oberle | B23D 53/04 |
| | | | 83/13 |
| 2015/0158097 A1 | 11/2015 | Myrfield | |
| 2017/0368622 A1 | 12/2017 | Krebber et al. | |

OTHER PUBLICATIONS

International Preliminary Report on Patentability filed in the corresponding PCT Application; 8 pages.

* cited by examiner

METHOD OF CUTTING WITH A BAND SAW

CROSS-REFERENCE TO RELATED APPLICATIONS

This application is a continuation-in-part of International Application Serial No. PCT/US21/26356 for a METHOD OF CUTTING WITH A BAND SAW, filed on Apr. 8, 2021, which claimed the benefit of U.S. Prov. Pat. App. Ser. No. 63/007,157 filed Apr. 8, 2020, and U.S. Prov. Pat. App. Ser. No. 63/105,989 filed Oc. 27, 2020, and U.S. patent application Ser. No. 17/079,301 filed on Oct. 23, 2020. All of these applications are hereby incorporated by reference in their entireties.

BACKGROUND

The present disclosure relates in general to cutting tools.

For a given blade, the number of Teeth Per Inch (TPI) of length of a cutting edge, the "TPI," is fixed. The TPI along with gullet size, width and depth of the space between the teeth generally dictates the kinds of material that can be cut with the blade. The TPI of a blade also tends to dictate the range of workpiece sizes that can be cut with the blade. Blades with a low TPI generally deliver faster cuts with rougher edges and are ideal for cutting wood. A general rule of thumb is that a saw blade with more teeth results in a smoother cut and a saw blade with fewer teeth results in a faster cut. Other considerations that impact the cut quality are the feed and speed, that is how fast the material is fed into the saw blade and how fast the saw blade is turning.

Blades are utilized in bandsaws. The blade of a bandsaw is a continuous band of toothed metal stretched between two or more wheels. The wheels are rotated to pass the blade through the material. Bandsaws can be used in woodworking, metalworking, non-metal-working and lumbering. Bandsaws can be utilized to cut a variety of materials.

FIG. 2 is a side view of a blade during a cutting process by a bandsaw. A blade 10 includes at least one tooth 12. The tooth 12 defines a tip 14 and a cutting face 16. The blade 10 is passing through a workpiece 18 to remove material from the workpiece 18. The direction of movement of the blade 10 is referenced at 20. A present outer surface of the workpiece 18 is referenced at 22 and a cutting depth 24. A surface that will be exposed after the cutting motion is referenced at 26.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In summary, the present disclosure relates to a method of cutting a workpiece with a band saw. The method includes rotating, with a band saw machine, a blade about a central longitudinal axis. The method also includes moving, with the band saw machine, at least one of the blade and a workpiece rectilinearly along the central longitudinal axis relative to the other during said rotating to form a cut in the workpiece. The method also includes supporting a back edge of the blade at one of a first position before a lateral entry position of the cut and a second position after a lateral exit position of the cut, during said rotating, with a first back support member. The method also includes extending, during said rotating and said moving, a first extension arm of the first back support member and thereby shifting the back edge of the blade at the one of the first position and the second position a first distance rectilinearly along the central longitudinal axis toward the workpiece, wherein said shifting is cumulative to rectilinear movement from said moving.

BRIEF DESCRIPTION OF THE DRAWINGS

The detailed description set forth below references the following drawings.

DETAILED DESCRIPTION

The present disclosure allows a blade having a fixed TPI to be utilized beyond its applicable range as defined by the prior art. The present disclosure includes altering the path of cutting movement of the blade. The movement of the blade can be controlled by a powered tool, such as a bandsaw. Thus, the path of movement followed by the blade can be implemented by the powered tool in which the blade is mounted. In one exemplary embodiment, the blade can rock back and forth in the cut, like a logger cuts wood. End users can enjoy using a single blade across a plurality of ranges and also enjoy enhanced blade life.

Figure 3:
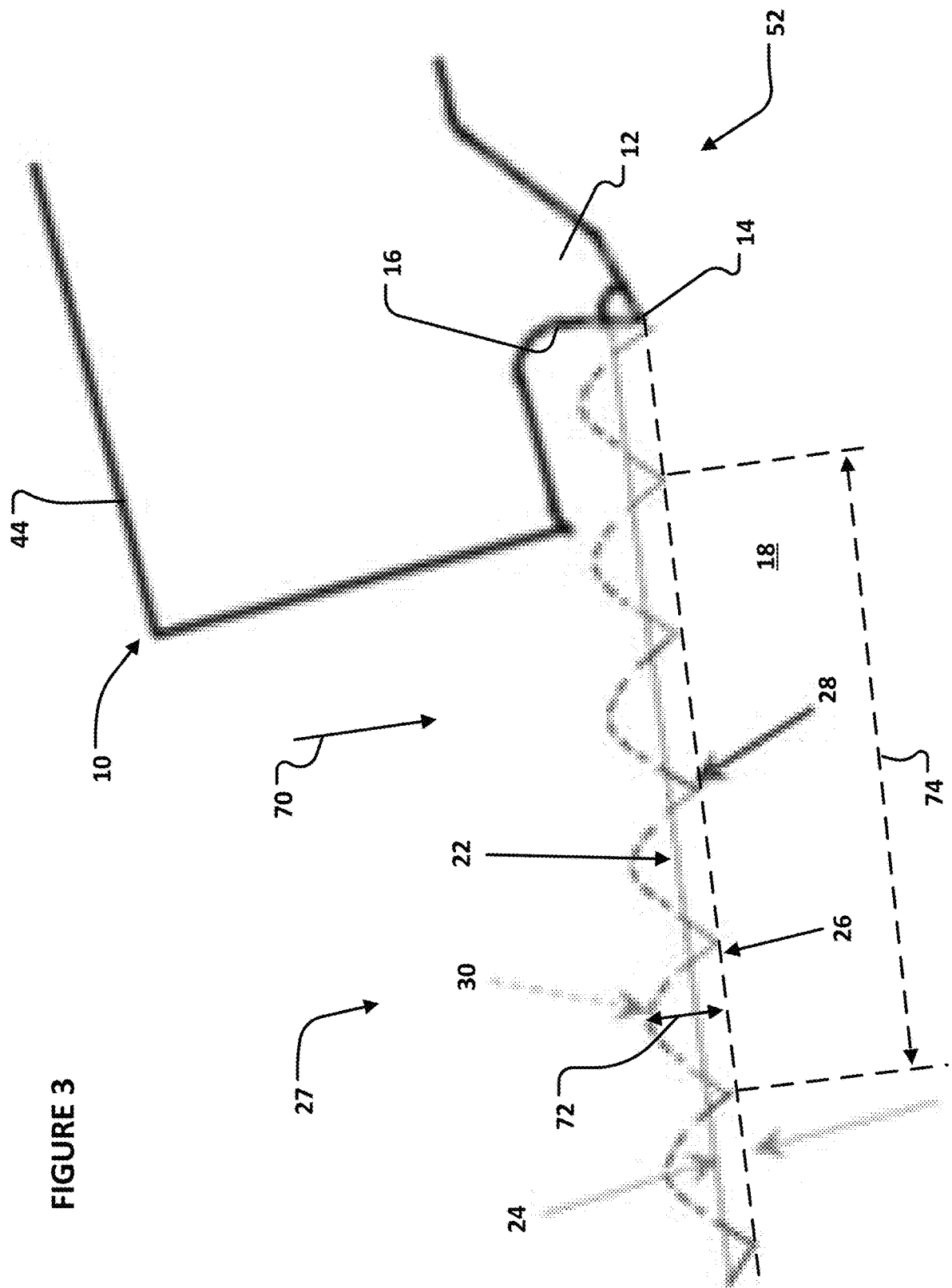
FIG. 3 is a side view of a blade during a cutting process according to the present disclosure.

Referring now to the drawings, there is illustrated in FIG. 3 a side view of the blade 10 during a cutting process according to the present disclosure. The exemplary blade 10 is a bandsaw blade. The blade 10 includes the at least one tooth 12 that defines the tip 14 and the cutting face 16. While only one tooth 12 is shown, the blade 10 can include a plurality of teeth. The blade 10 is passing through the workpiece 18 to remove material from the workpiece 18. The present outer surface 22 of the workpiece 18 will be removed to the cutting depth 24 to expose the surface 26.

An exemplary path 27 of motion of the tip 14 is represented by solid-line portions and dashed-line portions. An exemplary solid-line portion is referenced at 28. During the movement along the portion of the path 27 referenced by solid-line portions, the tooth 12 is engaged with the workpiece and removing material. An exemplary dashed-line portion is referenced at 30. During the movement along the portion of the path 27 referenced by dashed-line portions, the tooth 12 is disengaged with the workpiece and not removing material. The exemplary path 27 thus defines a pulsating motion of the blade 10, the motion having a frequency and an amplitude.

The path 27 is exemplary. Paths applied to the blade 10 in other embodiments of the present disclosure can be differently shaped. In one example, the blade 10 can be moved along a path appearing in a Figure such as FIG. 3 as a square-wave. When such a path is chosen, the tooth 12 can move linearly (across the workpiece) through part of the workpiece 18, can be raised vertically away from the workpiece 18, can move linearly over the workpiece 18, and then be lowered vertically back into the workpiece 18.

A bandsaw tool can be configured to move the blade 10 along the path 27. In the prior art, a bandsaw is operated based on selecting the speed of the blade 10 and the feed rate. The speed of the blade 10 corresponds to movement of the blade 10 in a direction across the workpiece 18. The feed rate corresponds to movement of the blade 10 into the workpiece 18. In the present disclosure, a bandsaw can be configured to be operated based on selecting the speed of the blade 10, the feed rate, a frequency, and an amplitude.

Figure 4:
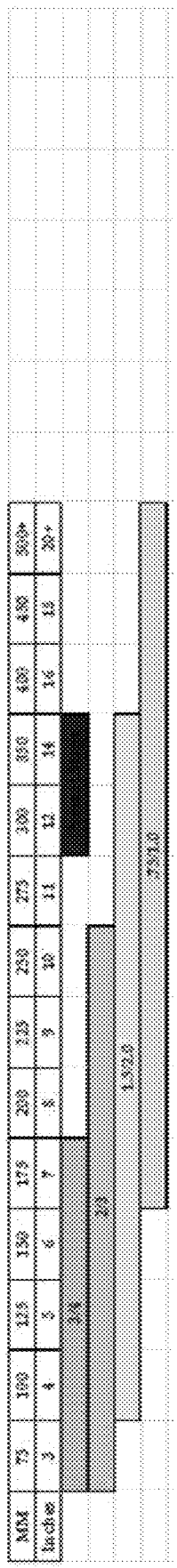
FIG. 4 is a table comparing the applicability of a blade according to the prior art relative to the size of a workpiece.
Figure 5:
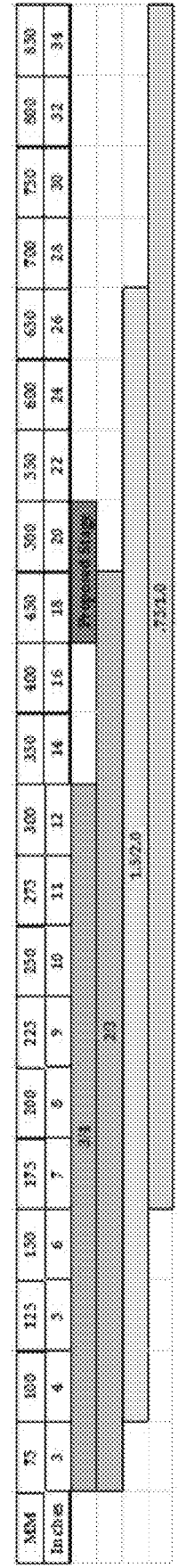
FIG. 5 is a table comparing the applicability of a blade according to the present disclosure relative to the size of a workpiece.

FIGS. 3 and 4 are tables comparing the applicability of a blade according to the prior art and to the present disclosure, relative to the size of a workpiece. The values of length in the tables correspond to sizes of workpieces. The bands below the values of length correspond to TPI values. The table of FIG. 4 shows that, according to the prior art, a blade having a TPI of ¾ can be utilized in workpieces between 3-7 inches. The table of FIG. 5 shows that the same blade, when moved during cutting according to the present disclosure, can be utilized in workpieces between 3-12 inches. The tables also show that blades of all TPIs can be more-broadly used by being moved during cutting according to the present disclosure.

Figure 6:
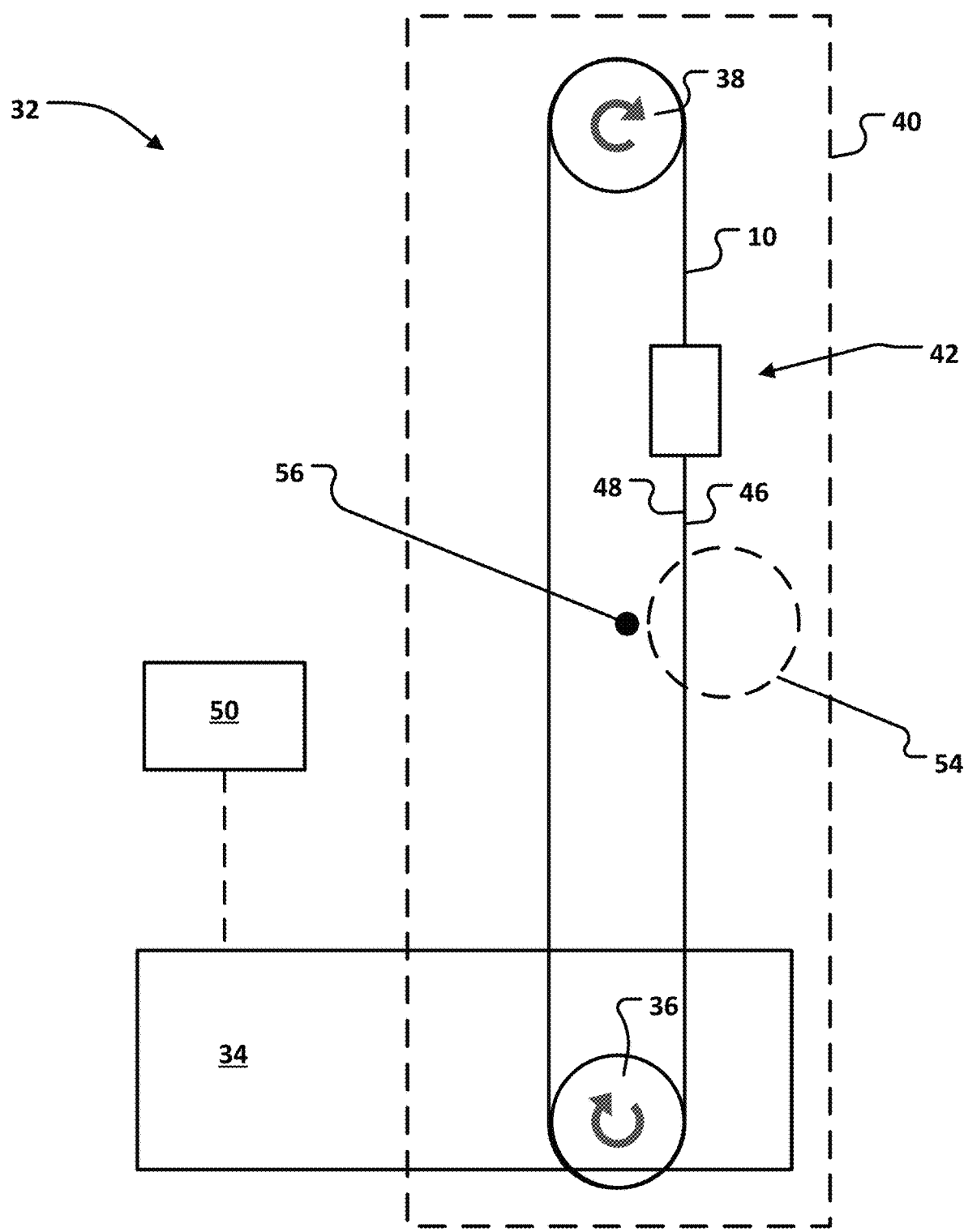
FIG. 6 is a schematic front view of band saw machine on which the exemplary blade is mounted and moved.
Figure 7:
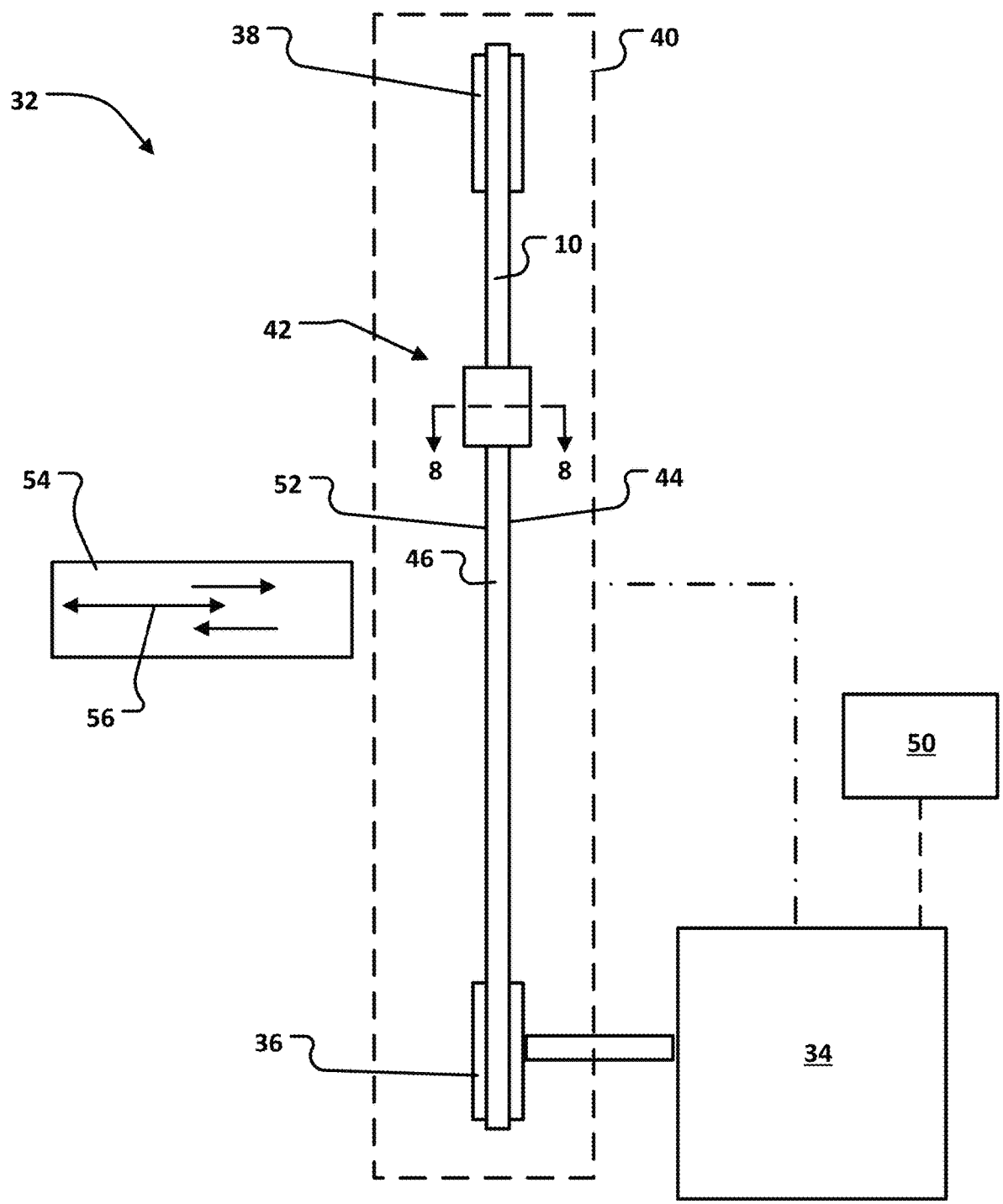
FIG. 7 is a schematic side view of the band saw shown in FIG. 6.
Figure 8:
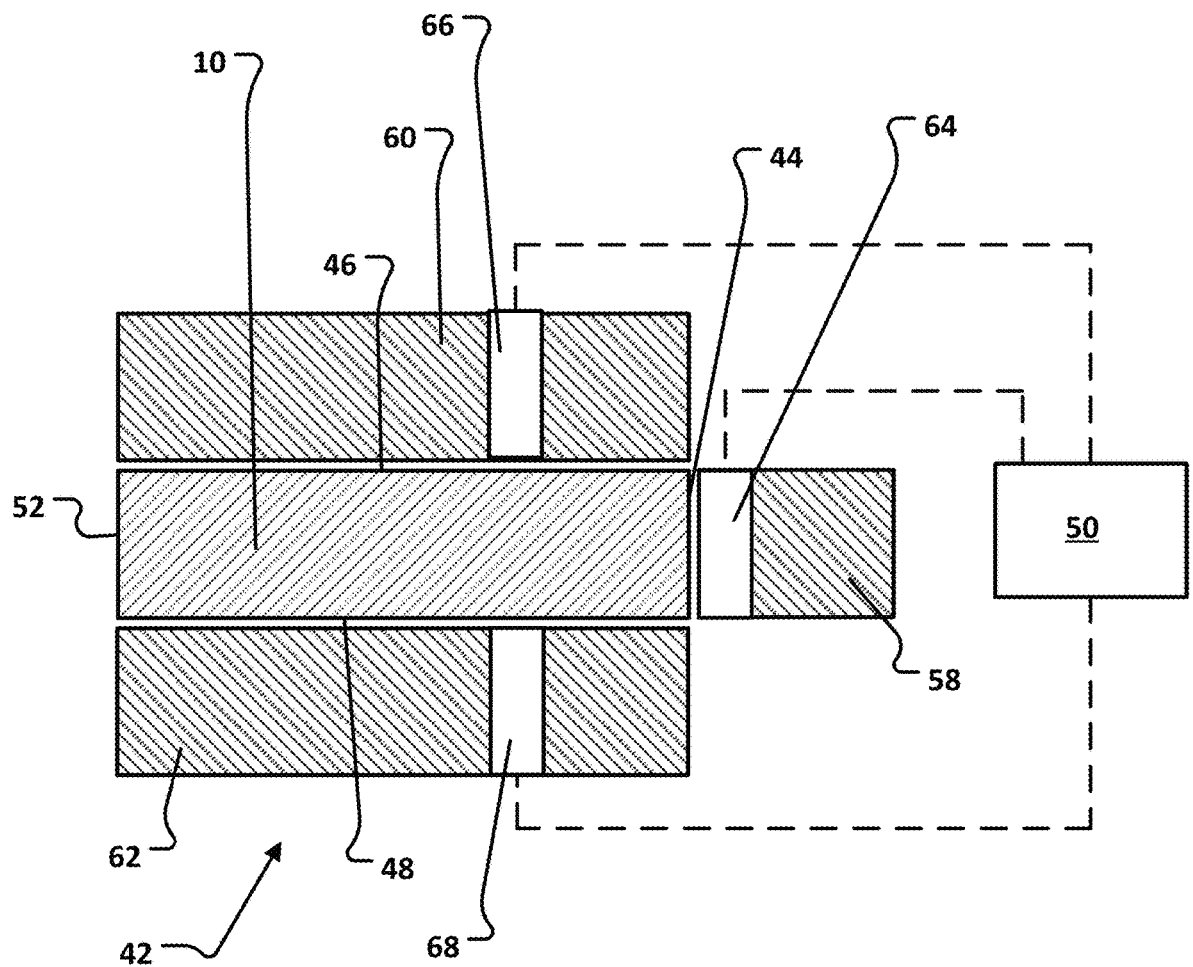
FIG. 8 is a section view taken along section lines 8-8 in FIG. 7.

Referring now to FIGS. 5-7, a band saw machine 32 includes a motor assembly 34, the blade 10, a driving wheel 36, an idler wheel 38, a frame 40 (referenced in dash line), a controller 50, and at least one supporting block 42. The exemplary motor assembly 34 includes a motor and one or more transmission assemblies so that power generated by the motor can be output as desired. In the exemplary embodiment, the motor assembly 34 includes a first transmission assembly transmitting power to the driving wheel 36 to rotate the driving wheel 36 for rotating the blade 10 and a second transmission assembly transmitting power to rectilinearly move the frame 40 and the blade 10. The driving wheel 36 and the idler wheel 38 are mounted for rotation on the frame 40. The blade 10 extends around both the driving wheel 36 and the idler wheel 38. The supporting block 42 can also be mounted on the frame 40 and surrounds the blade 10 on three sides: the back edge 44, a first lateral side edge 46, and a second lateral side edge 48. The toothed-edge 52 of the blade 10 is exposed. The band saw machine 32 can include a plurality of supporting blocks positioned around the frame 40 so that the blade 10 is supported at a plurality of locations.

In an exemplary method of cutting a workpiece 54 with the band saw machine 32, the band saw machine 32 can rotate the blade 10 about a central longitudinal axis 56. The back edge 44 of the blade 10 can be supported during rotation with a back support 58 of the supporting block 42. The first lateral side edge 46 of the blade 10 can be supported during rotation with a first lateral side support 60 of the supporting block 42. The second lateral side edge 48 of the blade 10, opposite to the first lateral side edge 46, can be supported during rotation with a second lateral side support 62 of the supporting block 42. The supports 58, 60, 62 can prevent movement of the blade 10, respectively, away from the workpiece 54 and to lateral sides.

The exemplary band saw machine 32 includes a first sensor 64, a second sensor 66 and a third sensor 68. A first level of force exerted against the back support 58 can be monitored with the first sensor 64. The first sensor 64 can transmit sensed conditions to the controller 50. A second level of force exerted against the first lateral side support 60 can be monitored with a second sensor 66. The second sensor 66 can transmit sensed conditions to the controller 50. A third level of force exerted against the second lateral side support 62 can be monitored with a third sensor 68. The third sensor 68 can transmit sensed conditions to the controller 50. It is noted that the first sensor 64, second sensor 66, and/or the third sensor 68 can be a pressure sensor or a piezoelectric sensor, or some other form of sensor that can sense conditions corresponding to force or pressure.

The exemplary band saw machine 32 is configured to move the blade 10 along the central longitudinal axis 56 during the rotating. As noted above, a motor of the band saw machine 32 can be utilized to both rotate the blade 10 about the central longitudinal axis 56 and also to move the blade 10 along the central longitudinal axis 56 in one or more embodiments of the present disclosure. In such embodiments, the band saw machine 32 can include appropriate transmissions for transmitting power generated by the motor to rotate and translate. The exemplary controller 50 is a computing device having one or more processors configured to dynamically control the band saw machine 32 during the rotating and during the moving. The exemplary controller 50 is configured to dynamically control the band saw machine 32 during the moving in response to at least one of the first level of force, the second level of force, and the third level of force. The controller 50 can be configured to dynamically control the band saw machine 32 during the moving in response to all of the first level of force, the second level of force and the third level of force.

The exemplary controller 50 can be configured to dynamically control the band saw machine 32 whereby a direction of rectilinear movement of the blade 10 along the central longitudinal axis 56 is changed in response to an increase in the first level of force sensed by the first sensor 64. For example, the controller 50 can control the motor of the band saw machine 32 to stop moving the blade 10 toward the workpiece 54 and instead move the blade 10 away from the workpiece 54 in response to a predetermined amount of increase in the first level of force. In another example, a change in the rectilinear direction of movement of the blade 10 along the central longitudinal axis 56 can be defined by stopping rectilinear movement. For example, the controller 50 can control the motor of the band saw machine 32 to stop moving the blade 10 toward the workpiece 54 and cease movement along the central longitudinal axis 56 in response to a predetermined amount of increase in the first level of force. The predetermined amount can be defined by a nominal value of force in Newtons or by a percentage change in the level of force.

The exemplary controller 50 can be configured to dynamically control the band saw machine 32 to change a direction of rectilinear movement of the blade 10 along the central longitudinal axis 56 in response to a decrease in the first level of force sensed by the first sensor 64. For example, the controller 50 can control the motor of the band saw machine 32 to stop moving the blade 10 away from the workpiece 54 and instead move the blade 10 toward the workpiece 54 in response to a predetermined amount of decrease in the first level of force. In another example, a change in the rectilinear direction of movement of the blade 10 along the central longitudinal axis 56 can also be defined by stopping rectilinear movement. For example, the controller 50 can control the motor of the band saw machine 32 to stop moving the blade 10 away from the workpiece 54 and cease movement along the central longitudinal axis 56 in response to a predetermined amount of decrease in the first level of force.

The exemplary controller 50 can be configured to dynamically control the band saw machine 32 to change a velocity of rectilinear movement of the blade 10 along the central longitudinal axis 56 in response to an increase in the first level of force sensed by the first sensor 64. For example, the controller 50 can control the motor of the band saw machine 32 to slow movement of the blade 10 along the central longitudinal axis 56 toward the workpiece 54 in response to a predetermined amount of increase in the first level of force. Similarly, the exemplary controller 50 can be configured to dynamically control the band saw machine 32 to change a velocity of rectilinear movement of the blade 10 along the central longitudinal axis 56 in response to a decrease in the first level of force sensed by the first sensor 64. For example, the controller 50 can control the motor of the band saw machine 32 to increase a speed movement of the blade 10 along the central longitudinal axis 56 toward the workpiece 54 in response to a predetermined amount of decrease in the first level of force.

The exemplary controller 50 can be configured to dynamically control the band saw machine 32 to change an acceleration of rectilinear movement of the blade 10 along the central longitudinal axis 56 in response to an increase in the first level of force sensed by the first sensor 64. For example, the controller 50 can control the motor of the band saw machine 32 to accelerate the movement of the blade 10 along the central longitudinal axis 56 toward the workpiece 54 in response to a predetermined amount of increase in the first level of force. The velocity of movement and direction of movement need not necessarily change in response to an increase in acceleration. An increase in acceleration could allow an instantaneous rectilinear velocity of the blade 10 along the central longitudinal axis 56 to be maintained. Similarly, the exemplary controller 50 can be configured to dynamically control the band saw machine 32 to change an acceleration of rectilinear movement of the blade 10 along the central longitudinal axis 56 in response to a decrease in the first level of force sensed by the first sensor 64. For example, the controller 50 can control the motor of the band saw machine 32 to deaccelerate the movement of the blade 10 along the central longitudinal axis 56 toward the workpiece 54 in response to a predetermined amount of decrease in the first level of force. The velocity of movement and direction of movement need not necessarily change in response to an decrease in acceleration.

The exemplary controller 50 can be configured to dynamically control the band saw machine 32 to change a direction of rectilinear movement of the blade 10 along the central longitudinal axis 56 in response to an increase in the second level of force sensed by the second sensor 66 and/or in response to an increase in the third level of force sensed by the third sensor 68. For example, the controller 50 can control the motor of the band saw machine 32 to stop moving the blade 10 toward the workpiece 54 and instead move the blade 10 away from the workpiece 54 in response to a predetermined amount of increase in the second level of force. Increases in the sensed second and third levels of force can be indicative of excessive stress on the blade 10. It is noted that a level of force sensed by the second or third sensors 66, 68 that results in a change in direction can be greater than a level of force sensed by the first sensor 64 that results in a change in direction.

The exemplary controller 50 can be configured to dynamically control the band saw machine 32 to change a direction of rectilinear movement of the blade 10 along the central longitudinal axis 56 in response to a decrease in the second level of force sensed by the second sensor 66 and/or in response to an decrease in the third level of force sensed by the third sensor 68. For example, the controller 50 can control the motor of the band saw machine 32 to stop moving the blade 10 away from the workpiece 54 and instead move the blade 10 toward the workpiece 54 in response to a predetermined amount of decrease in the second level of force. In another example, a change in the rectilinear direction of movement of the blade 10 along the central longitudinal axis 56 can also be defined by stopping rectilinear movement. For example, the controller 50 can control the motor of the band saw machine 32 to stop moving the blade 10 away from the workpiece 54 and cease movement along the central longitudinal axis 56 in response to a predetermined amount of decrease in the second level of force.

The exemplary controller 50 can be configured to dynamically control the band saw machine 32 to change a velocity of rectilinear movement of the blade 10 along the central longitudinal axis 56 in response to an increase in the second level of force sensed by the second sensor 66. For example, the controller 50 can control the motor of the band saw machine 32 to slow movement of the blade 10 along the central longitudinal axis 56 toward the workpiece 54 in response to a predetermined amount of increase in the second level of force. Similarly, the exemplary controller 50 can be configured to dynamically control the band saw machine 32 to change a velocity of rectilinear movement of the blade 10 along the central longitudinal axis 56 in response to a decrease in the second level of force sensed by the second sensor 66. For example, the controller 50 can control the motor of the band saw machine 32 to increase a speed movement of the blade 10 along the central longitudinal axis 56 toward the workpiece 54 in response to a predetermined amount of decrease in the second level of force.

The exemplary controller 50 can be configured to dynamically control the band saw machine 32 to change an acceleration of rectilinear movement of the blade 10 along the central longitudinal axis 56 in response to an increase in the second level of force sensed by the second sensor 66. For example, the controller 50 can control the motor of the band saw machine 32 to accelerate the movement of the blade 10 along the central longitudinal axis 56 toward the workpiece 54 in response to a predetermined amount of increase in the second level of force. Similarly, the exemplary controller 50 can be configured to dynamically control the band saw machine 32 to change an acceleration of rectilinear movement of the blade 10 along the central longitudinal axis 56 in response to a decrease in the second level of force sensed by the second sensor 66. For example, the controller 50 can control the motor of the band saw machine 32 to deaccelerate the movement of the blade 10 along the central longitudinal axis 56 toward the workpiece 54 in response to a predetermined amount of decrease in the second level of force.

The exemplary controller 50 can be configured to dynamically control the band saw machine 32 to change at least one of a direction, velocity and acceleration of rectilinear movement of the blade 10 along the central longitudinal axis 56 only in response to increases in at least two of the first level of force sensed by the first sensor 64, the second level of force sensed by the second sensor 66, and the third level of force sensed by the third sensor 68. For example, the controller 50 can control the motor of the band saw machine 32 to stop moving the blade 10 toward the workpiece 54 and instead move the blade 10 away from the workpiece 54 in response to predetermined amounts of increase in at least two of first, second and third levels of force. In one or more operational settings, a rise in the level of force sensed by only one of the first sensor 64, second sensor 66, and third sensor 68 may not dictate changing the direction of movement. In one example, increases in force sensed by the first sensor 64 (associated with the back support 58) and one or both of the second sensor 66 and third sensor 68 can indicate that a change of direction should occur. It is noted that velocity and acceleration can be changed additionally or alternatively in response to detection of increases in the level of force sensed by two of the first sensor 64, second sensor 66, and third sensor 68.

The exemplary controller 50 can be configured to maintain at least one of the direction, the velocity or the acceleration of rectilinear movement of the blade 10 along the central longitudinal axis 56 despite an increase in one of the first level of force sensed by the first sensor 64, the second level of force sensed by the second sensor 66, and the third level of force sensed by the third sensor 68. The exemplary controller 50 can be configured to maintain an attribute of position/movement of the blade 10 in response to a decrease in at least a second of the first level of force sensed by the first sensor 64, the second level of force sensed by the second sensor 66, and the third level of force sensed by the third sensor 68. For example, the controller 50 can control the motor of the band saw machine 32 to maintain current movement of the blade 10 despite an increase in one of first, second and third levels of force when a decrease is sensed for one of the other two levels of force. Thus, the various sensed levels of force can be cumulatively applied in controlling movement of the blade 10.

The exemplary controller 50 can be configured to dynamically control the band saw machine 32 to change at least one of a direction, velocity and acceleration of rectilinear movement of the blade 10 along the central longitudinal axis 56 only in response to increases in the second level of force sensed by the second sensor 66 and the third level of force sensed by the third sensor 68, despite no increase in the first level of force sensed by the first sensor 64. For example, the controller 50 can control the motor of the band saw machine 32 to stop moving the blade 10 toward the workpiece 54 and instead move the blade 10 away from the workpiece 54 in response to predetermined amounts of increase in both of the second and third levels of force. While the conditions sensed by the first sensor 64 may be most indicative of the stress on the blade 10, in one or more operational settings, the level of force against the first sensor 64 may not be indicative of the stress on the blade 10.

In general operation, the controller 50 can be configured to receive inputs from a user, such as a size of the workpiece 54, the material of the workpiece 54, the shape of the workpiece 54, and the TPI of the blade 10. The size of the workpiece 54 can be defined by the largest dimension of the workpiece 54 through which the blade 10 will pass, such as, by way of example and not limitation, the outer diameter of a cylindrical workpiece when blade 10 is passed transverse to the central longitudinal axis of the workpiece 54. In response to receiving such inputs, the controller 50 can be configured to determine a speed that the blade 10 is rotated by the driving wheel 36 and the feed rate at which the blade 10 is moved through the workpiece 54.

The controller 50 can also be configured to implement a pulsating motion of the blade 10. The pulsating motion of the blade 10 can supplement the feed motion of the blade 10. For example, the desired feed motion of the blade can be defined at any instant in time by a predetermined first vector and the desired pulsating motion can be defined at any instant in time by a predetermined second vector. The instantaneous or net or actual motion of the blade 10 at any particular moment can be the combination of the first vector and the second vector. The first vector and/or the second vector can be a function with the forces sensed by the sensors 64, 66, 68 as variables.

With reference to FIG. 3, the feed motion defined by the first vector is referenced by arrow 70. The exemplary motion 70 is towards, or into, the workpiece 18. The exemplary pulsating motion defined instantaneously by the second vector is referenced over time by the half-wave form including a portion in solid line referenced by 28 and a portion in dash line referenced by 30. The pulsations can be generated by the back support members 76, 78 described below. The amplitude of the exemplary pulsating motion at a particular instant in time is referenced at 72. The frequency of the exemplary pulsating motion can be defined by distance or time variables. For example, the frequency of pulsations (half-wave forms) can be defined by the size of the workpiece 18 or increments of the size, such as ten pulsations per centimeter of workpiece size. Referring again to FIG. 3, the pulsating motion can have a frequency defined by the distance referenced at 74. In another example, the blade 10 can be pulsated every second of cutting time.

Further, as discussed above, the frequency of pulsations can be based on the forces sensed by the sensors 64, 66, 68. In one example, the frequency of pulsations of the blade 10 can initially be one pulsation for every second of cutting time. If the forces sensed by one of the sensors 64, 66, 68 reach a predetermined level, the frequency of pulsations of the blade 10 can changed be two or more pulsations for every second of cutting time. Similarly, by way of example and not limitation, the amplitude of pulsations of the blade 10 can initially be one millimeter. If the forces sensed by one of the sensors 64, 66, 68 reach a predetermined level, the amplitude of pulsations of the blade 10 can be changed to two millimeters.

Figure 1:
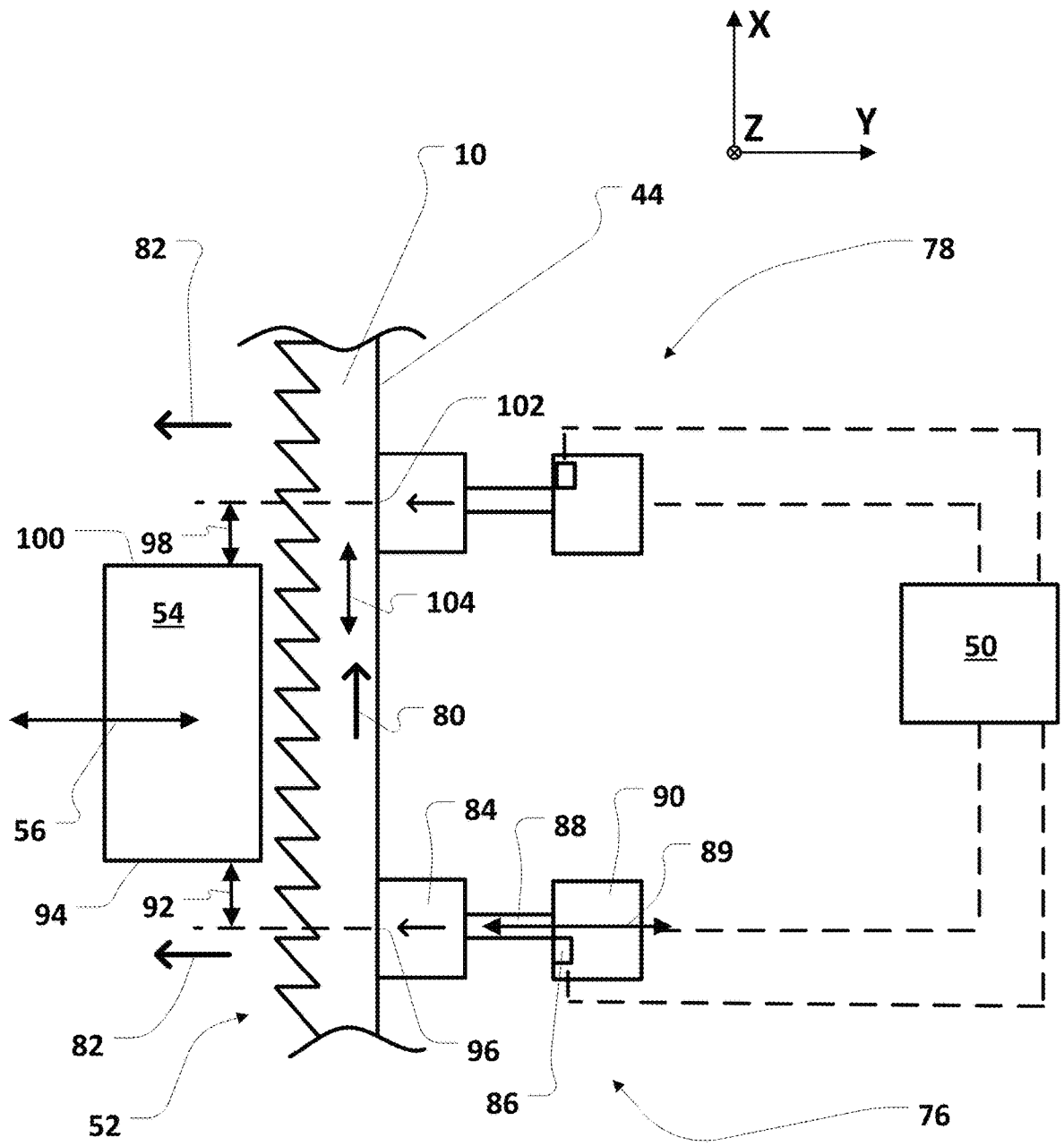
FIG. 1 is a schematic side view of a band saw according to another embodiment of the present disclosure.
Figure 2:
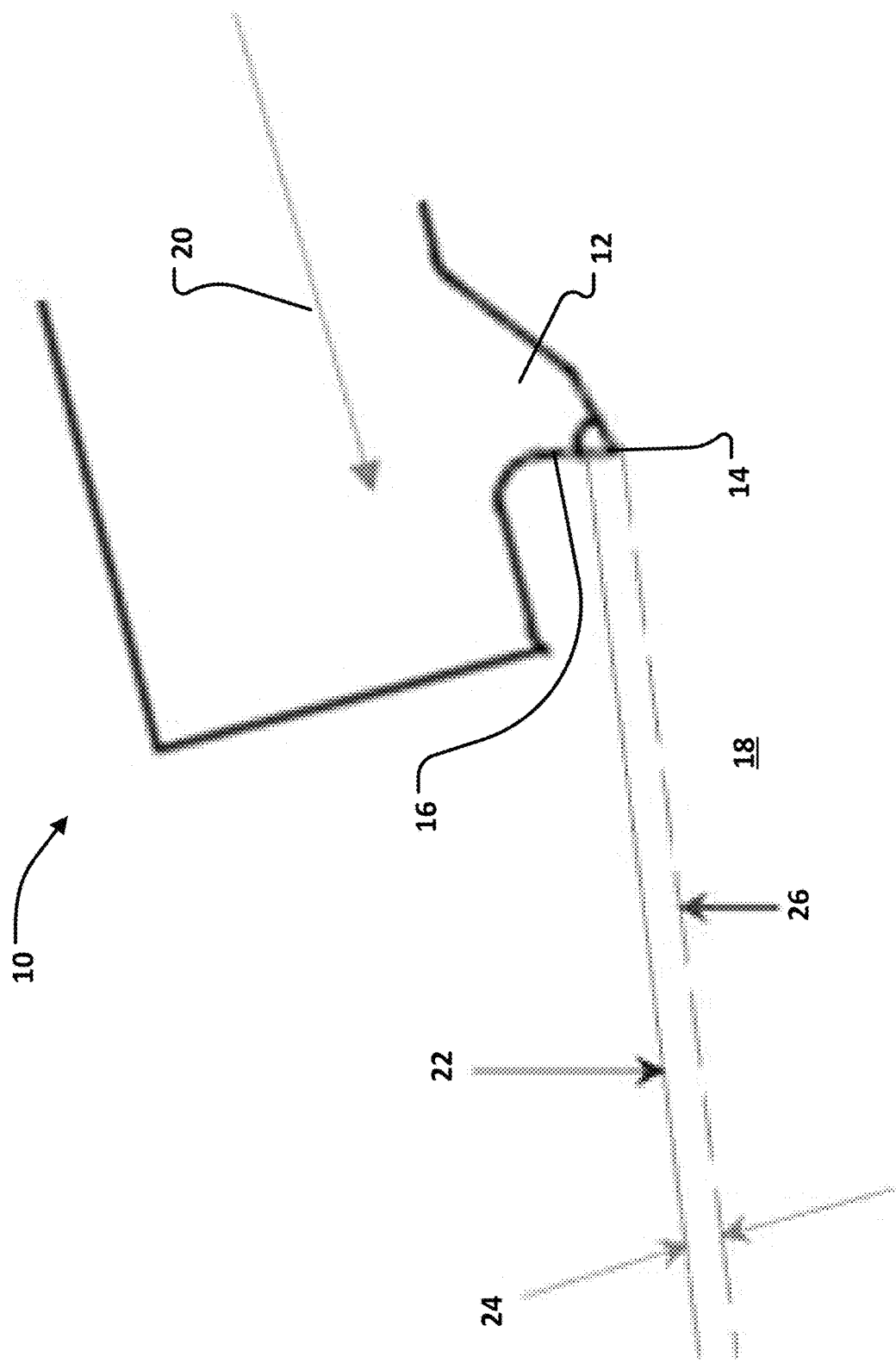
FIG. 2 is a side view of a blade during a cutting process according to the prior art.

Referring now to FIG. 1, in one or more embodiments of the present disclosure, a band saw machine can include back support members 76, 78 that apply respective forces to the back edge 44 of the blade 10. The back support members 76, 78 can be utilized with or without back supports such as back support 58 in one or more embodiments of the present disclosure. According to the perspective of FIG. 1 and with reference to the coordinate system shown in FIG. 1, the blade 10 is moving across the workpiece 54 (referenced by arrow 80) in the positive X direction. This motion is driven by the driving wheel 36. In addition, the blade 10 and workpiece 54 are moving relative toward one another along the Y-axis (the central longitudinal axis 56) to complete a cutting operation (referenced by arrows 82, which imply movement of the blade 10 through the workpiece 54 in the exemplary embodiment).

In the exemplary embodiment, the back support member 76 is positioned before a lateral entry position of a cut, which corresponds to a side 94 of the workpiece 54 at which each blade tooth enters the workpiece 54. The distance along an X-axis 104 between the position at which the back support member 76 contacts the back edge 44 of the blade 10 and the position at which the blade 10 enters the workpiece 54 is referenced at 92 in FIG. 1 and can be minimized. It is noted that in FIG. 1 the blade 10 and workpiece 54 are shown before prior to engagement.

The exemplary back support member 78 is positioned after a lateral exit position of the cut, which corresponds to a lateral side 100 of the workpiece 54 from which each blade tooth exits the workpiece 54. The distance along the X axis between the position at which the back support member 78 contacts the back edge 44 of the blade 10 and the position at which the blade 10 exits the workpiece 54 is referenced at 98 in FIG. 1 and can be minimized.

In the exemplary embodiment, the back support members 76, 78 are structured similarly and the description of the back support member 76 is applicable to the back support member 78. The back support member 76 includes a bearing portion 84 in contact with the blade 10 and supporting the blade 10 against movement away from the workpiece 54. The back support member 76 also includes an extension arm 88 that can extend and contract to adjust a position of the bearing portion. The back support member 76 also includes an actuator 90 configured to selectively extend or retract the extension arm 88. The movement of the bearing portion through extension/retraction of the extension arm 88 can be manifest in a varying level of force acting on the blade 10 through the bearing portion 84.

The back support member 76 also includes a sensor 86 configured to sense an amplitude or numerical value of the extension the extension arm 88. The sensor 86 can be arranged to communicate a signal corresponding to the amplitude of extension to the controller 50. The back support member 76 can selectively extend the extension arm 88 to the back side 44 of the blade 10 during the cutting operation on the workpiece 54. Extending the extension arm 88 thereby shifts the back edge 44 of the blade 10 along the central longitudinal axis 56 and the shift is cumulative to the rectilinear movement of the entire blade 10 along the axis 56 that is imparted by the motor assembly 34. The amplitude of extension can be variable. For example, the level of force that is applied can be defined by a sinusoidal wave pattern, a half-sinusoidal wave pattern, a square wave pattern, a pulse wave pattern, a triangle wave pattern, or a ramp-up or ramp-down wave pattern. The wave pattern can be defined by an amplitude and a frequency. The amount of extension, by way of example and not limitation, can be in the range of 1 micrometer to 10 millimeters.

In one or more embodiments of the present disclosure, the back support members 76, 78 can extend the respective extension arms asynchronously. In other words, the respective frequencies and/or amplitudes of extension/retraction can be different during the cutting process. For example, the extensions of the respective extension arms can occur at different times and/or the amplitudes of the extensions can be different. This allows the blade 10 to rock back and forth in the cut, like a logger cuts wood. The controller 50 can also be configured to control the respective levels of extension/contraction applied by the back support members 76, 78 in response to the levels of force sensed by force sensors positioned the bearing portions of the back support members 76, 78 or position other places.

After the extension arm of one of the back support members 76, 78 has extended and shifted the blade 10, that extension arm can be retracted. This allows the back edge 44 of the blade 10 to shift back to its position before the extension occurred. In various embodiments of the invention, one or both of the back support members 76, 78 can include a linear worm actuator or a hydraulic cylinder to effectuate extension and retraction.

In one or more embodiments of the present disclosure, a distance 92 between the first lateral side 94 of the workpiece 54 (where the blade 10 enters the workpiece 54) and a first position 96 at which the first support member 76 supports the back edge 44 of the blade 10 can be a distance, by way of example and not limitation, in the range of 0.01 meter to 0.5 meter along a lateral axis 104 that is perpendicular to the central longitudinal axis 56. A distance 98 between the second lateral side 100 of the workpiece 54 (where the blade 10 enters the workpiece 54) and a second position 102 at which the second support member 78 supports the back edge 44 of the blade 10 can be a distance, by way of example and not limitation, in the range of 0.01 meter to 0.5 meter along the lateral axis 104.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method of cutting a workpiece with a band saw machine having a blade comprising:
   rotating, with a motor assembly of the band saw machine, the blade about a central longitudinal axis;
   moving, with the band saw machine, at least one of the blade and a workpiece rectilinearly along the central longitudinal axis relative to the other during said rotating to form a cut in the workpiece;
   supporting a back edge of the blade at one of a first position before a lateral entry position of the cut and a second position after a lateral exit position of the cut, during said rotating, with a first back support member;
   extending, during said rotating and said moving, a first extension arm of the first back support member and thereby shifting the back edge of the blade at the one of the first position and the second position a first distance rectilinearly along the central longitudinal axis toward the workpiece, wherein said shifting is cumulative to rectilinear movement from said moving; supporting at least one lateral side edge of the blade with a first lateral side support;
   sensing, with at least one sensor embedded in one of the back support and the first lateral side support, a level of force acting on the blade; and
   changing, with a controller, a frequency of pulsations of said shifting in response to the level of force sensed by the at least one sensor during said sensing.

2. The method of claim 1 further comprising:
   retracting, after said extending, the first extension arm and thereby allowing the back edge of the blade at the one of the first position and the second position to shift the first distance rectilinearly along the central longitudinal axis away from the workpiece.

3. The method of claim 1 wherein said extending is further defined as:
extending the first extension arm of the first back support member in a sinusoidal wave pattern.

4. The method of claim 1 wherein said extending is further defined as:
extending the first extension arm of the first back support member in a half-sinusoidal wave pattern.

5. The method of claim 1 wherein said extending is further defined as:
extending the first extension arm of the first back support member in a triangle wave pattern.

6. The method of claim 1 wherein said extending is further defined as:
extending the first extension arm of the first back support member 1 micrometer to 10 millimeters.

7. The method of claim 1 wherein said supporting is further defined as:
supporting the back edge of the blade at the one of the first position before the lateral entry position of the cut and the second position after the lateral exit position of the cut, during said rotating, with the first back support member, wherein the one of the first position before the lateral entry position of the cut and the second position after the lateral exit position of the cut is 0.01 meter to 0.5 meter from the workpiece along an axis perpendicular to the central longitudinal axis.

8. The method of claim 1 wherein
said supporting is further defined as supporting the back edge of the blade at the first position before the lateral entry position of the cut with the first back support member;
said extending is further defined as extending, during said rotating and said moving, the first extension arm of the first back support member and thereby shifting the back edge of the blade at the first position the first distance rectilinearly along the central longitudinal axis toward the workpiece, wherein said shifting is cumulative to rectilinear movement from said moving;
and wherein said method further comprises:
supporting the back edge of the blade at the second position after the lateral exit position of the cut during said rotating with a second back support member; and
extending a second extension arm of the second back support member and thereby shifting the back edge of the blade at the second position a second distance rectilinearly along the central longitudinal axis wherein said shifting is cumulative to rectilinear movement from said moving.

9. The method of claim 8 wherein said extending the first extension arm and said extending the second arm are asynchronous whereby the first distance and the second distance are different.

10. The method of claim 8 wherein said extending the first extension arm and said extending the second arm are asynchronous whereby the first distance and the second distance are reached by the blade at the respective first position and second position at different times.

11. The method of claim 8 wherein:
said extending the first extension arm is further defined as extending the first extension arm of the first back support member in a first sinusoidal wave pattern;
said extending the second extension arm is further defined as extending the second extension arm of the second back support member in a second sinusoidal wave pattern; and
wherein said extending the first extension arm and said extending the second arm are asynchronous whereby the first sinusoidal wave pattern is shifted one hundred and eighty degrees from the second sinusoidal wave pattern.

12. The method of claim 8 wherein:
said extending the first extension arm is further defined as extending the first extension arm of the first back support member in a first half-sinusoidal wave pattern;
said extending the second extension arm is further defined as extending the second extension arm of the second back support member in a second half-sinusoidal wave pattern; and
wherein said extending the first extension arm and said extending the second arm are asynchronous whereby the first half-sinusoidal wave pattern is shifted one hundred and eighty degrees from the second half-sinusoidal wave pattern.

13. The method of claim 8 wherein:
said supporting the back edge of the blade at the first position is further defined as supporting the back edge of the blade at the first position a distance of 0.01 meter to 0.5 meter before the lateral entry position of the cut with the first back support member along a lateral axis perpendicular to the central longitudinal axis; and
said supporting the back edge of the blade at the second position is further defined as supporting the back edge of the blade at the second position a distance of 0.01 meter to 0.5 meter after the lateral exit position of the cut during said rotating with the second back support member.

* * * * *